US010999879B2

(12) United States Patent
Beck et al.

(10) Patent No.: US 10,999,879 B2
(45) Date of Patent: May 4, 2021

(54) METHOD, ARRANGEMENT AND DEVICES FOR ENABLING A HYBRID ACCESS GATEWAY SERVER TO IDENTIFY AN ACCESS TYPE OF TRAFFIC ORIGINATING FROM A CUSTOMER-PREMISES EQUIPMENT

(71) Applicant: Telefonaktiebolaget LM Ericsson (publ), Stockholm (SE)

(72) Inventors: Martin Beck, Herzogenrath (DE); Bengt-Dirk Heye, Cologne (DE); Iulian Ionita, Herzogenrath (DE); Mounir Merhi, Herzogenrath (DE); Pedro Tercero, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 56 days.

(21) Appl. No.: 16/302,288

(22) PCT Filed: Jun. 20, 2016

(86) PCT No.: PCT/EP2016/064184
§ 371 (c)(1),
(2) Date: Nov. 16, 2018

(87) PCT Pub. No.: WO2017/220112
PCT Pub. Date: Dec. 28, 2017

(65) Prior Publication Data
US 2019/0297651 A1 Sep. 26, 2019

(51) Int. Cl.
H04W 76/10 (2018.01)
H04L 12/28 (2006.01)
H04W 48/16 (2009.01)
H04W 88/16 (2009.01)
(Continued)

(52) U.S. Cl.
CPC ............ *H04W 76/10* (2018.02); *H04L 12/287* (2013.01); *H04L 12/2858* (2013.01); *H04W 48/16* (2013.01); *H04L 2012/6429* (2013.01); *H04W 88/08* (2013.01); *H04W 88/16* (2013.01)

(58) Field of Classification Search
None
See application file for complete search history.

(56) References Cited

U.S. PATENT DOCUMENTS

2017/0311209 A1* 10/2017 Begen .................. H04L 45/745

OTHER PUBLICATIONS

"3rd Generation Partnership Project; Technical Specification Group Core Network and Terminals; Interworking between the Public Land Mobile Network (PLMN) supporting packet based services and Packet Data Networks (PDN) (Release 1999)", 3GPP TS 29.061 V3.14.1, Jun. 2005, pp. 1-64.
(Continued)

Primary Examiner — Kouroush Mohebbi
(74) Attorney, Agent, or Firm — Murphy, Bilak & Homiller, PLLC

(57) ABSTRACT

A method of, a customer-premises equipment for, and a hybrid access gateway server for, enabling a hybrid access gateway server to identity an access type of traffic originating from a customer-premises equipment, CPE, wherein said hybrid access gateway server is arranged to control access to a service network, and wherein said CPE comprises at least two Wide Area Network, WAN, interfaces.

20 Claims, 6 Drawing Sheets

(51) Int. Cl.
　　　*H04L 12/64*　　　(2006.01)
　　　*H04W 88/08*　　　(2009.01)

(56) References Cited

OTHER PUBLICATIONS

Lee, Ying-Da , "SOCKS: A protocol for TCP proxy across firewalls", http://www.socks.nec.com/socks4.protocol, pp. 1-4.
Leech, M., et al., "SOCKS Protocol Version 5", Network Working Group, RFC 1928, Mar. 1996, pp. 1-9.
"Clarification on BSSID Usage", 3GPP TSG-CT WG1 Meeting #91; C1-152240; Sanya (P.R. of China), May 25-29, 2015, pp. 1-8.
"Corrections to BBF Related References", SA WG2 Meeting #107; S2-150084; Sorrento, Italy, Jan. 26-30, 2015, pp. 1-12.
"ETSI TS 123 139 V12.3.0", Digital cellular telecommunications system (Phase 2+); Universal Mobile Telecommunications System (UMTS); LTE; 3GPP system—fixed broadband access network interworking; Stage 2 (3GPP TS 23.139 version 12.3.0 Release 12), Mar. 2016, pp. 1-90.
"ETSI TS 129 212 V7.4.0", Universal Mobile Telecommunications Systems (UMTS); Policy and charging control over Gx reference point (3GPP TS 29.212 version 7.4.0 Release 7), Apr. 2008, pages pp. 1-45.
"PCC Support of NBIFOM", SA WG2 Meeting #110; S2-152474; Dubrovnik, Croatia, Jul. 6-10, 2015, pp. 1-33.
"Telecommunications and Internet converged Services and Protocols for Advanced Networking (TISPAN); NGN Security; Security Architecture", Draft ETSI TS 187 003 v2.0.2, Oct. 2007, pp. 1-72.
Torvinen, Vesa, et al., "Implicit registrations with IMS residential gateways", TISPAN WG7, TD18, Interim Drafting Meeting, Oslo, XP-002396080, Apr. 2005, pp. 1-16.

\* cited by examiner

METHOD, ARRANGEMENT AND DEVICES FOR ENABLING A HYBRID ACCESS GATEWAY SERVER TO IDENTIFY AN ACCESS TYPE OF TRAFFIC ORIGINATING FROM A CUSTOMER-PREMISES EQUIPMENT

TECHNICAL FIELD

The present invention is generally related to identifying an access type of traffic originating from a customer-premises equipment and, more specifically, to measures to assist a hybrid access gateway server to facilitate the identifying process.

BACKGROUND

Results obtained from data traffic analysis reveal a rapid exponential growth of data traffic, and a continuation of this trend is expected in the upcoming years. In order to cope with such a demand, operators may upgrade or rebuild their (copper) access networks by, for example, replacing the copper networks with optical fibers. This is, however, a very costly approach.

Another realistic option is that the operators implement a so called hybrid access mechanism, which entails the bundling of two or even more access lines over different technologies, for example Digital Subscriber Line, DSL, and Long Term Evolution, LTE, to one internet connection for end customers. This aspect is described in more detail here below.

In a typical scenario, a customer is able to access the internet through a DSL access network. Over time, the requirements of the customer with respect to the available bandwidth, the available data throughput, etc., have increased substantially. The bandwidth of the DSL access network may, however, already be congested, i.e. fully occupied, and can thus not cope with the additional demand of the customer.

The operator may then decide to use an already deployed Long Term Evolution, LTE, backhaul network in the residing area of the customer alongside the DSL connection for improving the data throughput, bandwidth, of that particular customer. That is, the bandwidth resources of the LTE and the DSL network are used concurrently to transfer data to, and from, the customer, thereby ensuring a higher bandwidth to the customer and guarantying good customer experiences.

To achieve the above described functionality, a mechanism for binding these two networks, i.e. DSL and LTE networks, are designed, which is called a hybrid access mechanism. The hybrid access mechanism needs to have the capability in flexibly deciding the paths, i.e. the DSL network or the LTE network, to forward the data traffic.

According to the present disclosure, a hybrid access gateway is deployed between the service network, for example the public internet, and the communication networks, i.e. the DSL network and the LTE network. So, in case of such a hybrid access gateway, a customer premises equipment, CPE, of the customer's home network should have at least two Wide Area Network, WAN, interfaces. One interface is directed to, for example, LTE purposes and one interface to, for example, DSL purposes. Both of those interfaces may be used for contacting the hybrid access gateway for access to the service network, i.e. a public communication network like the internet.

In current implementations, the hybrid access gateway uses the Internet Protocol, IP, address of the physical WAN interface to identify the access type. The IP address of the DSL interface of the CPE is usually allocated by a Dynamic Host Configuration Protocol, DHCP, server, while the IP address of the LTE interface is usually assigned by the Packet Data Network Gateway, PGW, from its available IP addresses pool.

The hybrid access gateway should be aware about the IP addresses pools, i.e. ranges, to correctly determine the access type, i.e. DSL or LTE, of messages received from the CPE. This solution, however, presents certain problems.

First of all, manual configuration of the Hybrid Access Gateway with regards to the IP addresses pools is mandatory. This limitation can introduce disadvantages when the solution is being deployed massively, even in the case where both fixed and mobile accesses belong to the same operator.

Secondly, it becomes complicated when the mobile and fixed accesses are provided by different operators, where they have to share their specific IP addressing information. Overlapping IP address pools between those different operators may result in an inaccurate determination of the access type.

SUMMARY

It is an object to provide for method of enabling a hybrid access gateway server to efficiently and accurately identify an access type of traffic originating from a customer-premises equipment, CPE.

It is another object to provide for an arrangement of a CPE and a hybrid access gateway server, a CPE, a hybrid access gateway server and a non-transitory computer-readable storage medium involved within the methods as presented.

In a first aspect, there is provided a method of enabling a hybrid access gateway server to identify an access type of traffic originating from a customer-premises equipment, CPE, wherein said hybrid access gateway server is arranged to control access to a service network, and wherein said CPE comprises at least two Wide Area Network, WAN, interfaces, wherein each of said at least two WAN interfaces is related to a different access type.

The method comprising the steps of receiving, by said CPE, from a User Equipment, UE, a request message for requesting access to said service network; determining, by said CPE, an applicable access type for said received request message; embedding, by said CPE, said determined applicable access type in a connect message to be sent to said hybrid access gateway server for connecting said UE to said service network; transmitting, by said CPE, said connect message having embedded therein said applicable access type, via a first of said at least two WAN interfaces, said first WAN interface being the one related to said applicable access type, to said hybrid access gateway server enabling said hybrid access gateway server to identify said access type; determining, by said hybrid access gateway server, said access type by receiving said connect message and by identifying said embedded applicable access type.

The method is at least based on the insight that the CPE should at least include its access type in a connect message which is to be sent to the hybrid access gateway server for connecting the UE to the service network, for example a public communication network. In such a way, the hybrid access gateway server does not need to look at the source IP address of the received messages to determine the actual access type, as the access type is embedded in the received message itself. The obtained access type may be used for several reasons such a steering traffic, policing, lawful interception, etc.

The above described feature improves the accuracy of the detection process of the particular access type. This, because the method wherein the hybrid access gateway server determines the access type by investigating the source IP address of the incoming message is prone to errors and the risk of any error is reduced substantially in case the CPE itself includes the access type in the connect message sent to the hybrid access gateway server.

There are several advantages of using a hybrid access gateway server in accordance with the present invention, i.e. a broader bandwidth capability while leveraging the existing network, Flexible way of network deployment with decoupling the life cycle for, for example, DSL and LTE access, broader bandwidth capability in fixed data traffic challenges, enhanced network reliability, and guaranteed service continuity.

Another advantage is related to the scalability for multiple connections. Operations are able to decide whether to grant connections depending on the determined access type. For example, multiple connections from the same access type may be refused. The presented method may further be implemented in already existing protocols, thereby simplifying the implementation process. As such, there is no need for a new protocol to convey the access type information to the hybrid access gateway server. Even further, policy and charging control based on standard access type attributes is enabled, i.e. they can be applied based on the determined access type.

In accordance with the present disclosure, a CPE is any terminal and/or associated equipment located at a subscriber's premises and having at least two WAN interfaces for connection to a communication network. The communication network may be an LTE network, a DSL network or any other type of network. The at least two WAN interfaces may be of the same access type, but may also be of a different access type. Typically, the CPE is connected with carrier's telecommunication channel at the demarcation point. The demarcation point is a point established in a building or complex to separate customer equipment from the equipment located in either the distribution infrastructure or central office of the communications service provider.

CPE generally refers to devices such as telephones, routers, switches, residential gateways, set-top boxes, fixed mobile convergence products, home networking adapters and Internet access gateways that enable consumers to access communications service providers' services and distribute them around their house via a local area network.

In an example, the method further comprises the step of steering, by said hybrid access gateway server, said traffic between said CPE and said service network based on said identified applicable access type. That is, for example, in case it has been determined, by the hybrid access gateway server, that the access type for the received request message is DSL, then any message sent to that CPE travels, i.e. is steered, through the DSL network.

In a second aspect, there is provided a method of enabling a hybrid access gateway server to identify an access type of traffic originating from a customer-premises equipment, CPE, wherein said hybrid access gateway server is arranged to control access to a service network, and wherein said CPE comprises at least two Wide Area Network, WAN, interfaces, wherein each of said at least two WAN interfaces is related to a different access type.

The method comprises the steps of receiving, by said CPE, from a User Equipment, UE, a request message for requesting access to said service network; determining, by said CPE, an applicable access type for said received request message; embedding, by said CPE, said determined applicable access type in a connect message to be sent to said hybrid access gateway server; and transmitting, by said CPE, said connect message having embedded therein said applicable access type, via a first of said at least two WAN interfaces, said first WAN interface being the one related to said applicable access type, to said hybrid access gateway server enabling said hybrid access gateway server to identify said access type.

The presented method is at least based on the insight that the CPE itself should embed the determined applicable access type in the connect message to be sent to the hybrid access gateway server. The CPE has several ways to its disposal for determining what the access type is. It may, for example, investigate the request message received from the UE.

Once the CPE has determined the applicable access type for the received request message, it will embed the determined applicable access type in a connect message to be sent to the hybrid access gateway server. To do so, the CPE may introduce a variable representing the access type in a field of the connect message designed for said variable. The variable may, for example, comprise an integer value between 0-8, wherein each integer value represents a certain access type. So, for example, value 0 represents 3rd Generation Partnership Project, 3GPP, access, value 1 represents Data Over Cable Service Interface Specification, DOCSIS, access, value 2 represents x-Digital Subscriber Line, xDSL, access, value 3 represents Worldwide Interoperability for Microwave Access, WiMAX access, value 4 represents 3rd Generation Partnership Project 2, 3GPP2, access, etc.

In a further example, said CPE comprises two, WAN, interfaces, wherein each of said two WAN interfaces is related to a different access type.

In another example, said step of embedding, by said CPE, said determined applicable access type in a connect message to be sent to said hybrid access gateway server comprises:
 embedding, by said CPE, said determined applicable access type in a dedicated field reserved in said connect message for identifying said access type.

As mentioned before, the service network may be a public communication network like the internet.

In a third aspect, there is provided a method of identifying, by a hybrid access gateway server, an access type of traffic originating from a customer-premises equipment, CPE, wherein said hybrid access gateway server is arranged to control access to a service network, and wherein said CPE comprises at least two Wide Area Network, WAN, interfaces.

Here, the method comprises the steps of receiving, by said hybrid access gateway server, from said CPE, a connect message for requesting access to said service network, said connect message having embedded therein an applicable access type of traffic originating from said CPE; and determining, by said hybrid access gateway server, said access type by identifying said embedded access type in said connect message.

In an example hereof, the method further comprises the step of steering, by said hybrid access gateway server, said traffic between said CPE and said service network based on said identified applicable access type.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the arrangement of the CPE and the hybrid access gateway server, the CPE itself and the hybrid gateway server itself.

In a fourth aspect, there is provided an arrangement of a customer-premises equipment, CPE, and a hybrid access gateway server, wherein said arrangement is arranged to enable said hybrid access gateway server to identify an access type of traffic originating from said CPE, wherein said hybrid access gateway server is arranged to control access to a service network, and wherein said CPE comprises at least two Wide Area Network, WAN, interfaces.

Here, the CPE comprises receive equipment arranged for receiving, from a User Equipment, UE, a request message for requesting access to said service network; process equipment arranged for determining an applicable access type for said received request message; embed equipment arranged for embedding said determined applicable access type in a connect message to be sent to said hybrid access gateway server for connecting said UE to said service network; and transmit equipment arranged for transmitting said connect message having embedded therein said applicable access type, via a first of said at least two WAN interfaces, said first WAN interface being the one related to said applicable access type, to said hybrid access gateway server enabling said hybrid access gateway server to identify said access type.

The hybrid access gateway server comprises receive equipment arrange for receiving, from said CPE, said connect message for requesting access to said service network, said connect message having embedded therein said applicable access type of traffic originating from said CPE; and identify equipment arranged for determining said access type by receiving said connect message and by identifying said embedded applicable access type for said traffic.

In a fifth aspect, there is provided a customer-premises equipment, CPE, arranged for enabling a hybrid access gateway server to identify an access type of traffic originating from said CPE, wherein said hybrid access gateway server is arranged to control access to a service network, and wherein said CPE comprises at least two Wide Area Network, WAN, interfaces.

The CPE comprises receive equipment arranged for receiving, from a User Equipment, UE, a request message for requesting access to said service network; process equipment arranged for determining an applicable access type for said received request message; embed equipment arranged for embedding said determined applicable access type in a connect message to be sent to said hybrid access gateway server for connecting said UE to said service network; and transmit equipment arranged for transmitting said connect message having embedded therein said applicable access type, via a first of said at least two WAN interfaces, said first WAN interface being the one related to said applicable access type, to said hybrid access gateway server enabling said hybrid access gateway server to identify said access type.

The CPE is, more specifically any of a router, switch or internet access gateway.

In a sixth aspect there is provided a hybrid access gateway server arranged for identifying an access type of traffic originating from a customer-premises equipment, CPE, wherein said hybrid access gateway server is arranged to control access to a service network, and wherein said CPE comprises at least two Wide Area Network, WAN, interfaces.

The hybrid access gateway server comprising receive equipment arrange for receiving, from said CPE, said connect message for requesting access to said service network, said connect message having embedded therein said applicable access type of traffic originating from said CPE; identify equipment arranged for determining said access type by receiving said connect message and by identifying said embedded applicable access type for said traffic.

The hybrid access gateway server may further comprise steer equipment arranged for steering said traffic between said CPE and said service network based on said identified applicable access type.

In a seventh aspect, there is provided a non-transitory computer-readable storage medium, comprising instructions which, when executed on at least one processor, cause the at least one processor to carry out the method according to any of the method examples as described above.

In an eight aspect, there is provided a customer-premises equipment, CPE, for enabling a hybrid access gateway server to identify an access type of traffic originating from said CPE, wherein said hybrid access gateway server is arranged to control access to a service network, and wherein said CPE comprises at least two Wide Area Network, WAN, interfaces, wherein said CPE comprises:

receive module for receiving, from a User Equipment, UE, a request message for requesting access to said service network;

process equipment arranged for determining an applicable access type for said received request message;

embed module for embedding said determined applicable access type in a connect message to be sent to said hybrid access gateway server for connecting said UE to said service network;

transmit module for transmitting said connect message having embedded therein said applicable access type, via a first of said at least two WAN interfaces, said first WAN interface being the one related to said applicable access type, to said hybrid access gateway server enabling said hybrid access gateway server to identify said access type.

In a ninth aspect, there is provided a hybrid access gateway server for identifying an access type of traffic originating from a customer-premises equipment, CPE, wherein said hybrid access gateway server is arranged to control access to a service network, and wherein said CPE comprises at least two Wide Area Network, WAN, interfaces, said hybrid access gateway server comprising:

receive module for receiving, from said CPE, said connect message for requesting access to said service network, said connect message having embedded therein said applicable access type of traffic originating from said CPE;

identify module for determining said access type by receiving said connect message and by identifying said embedded applicable access type for said traffic.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
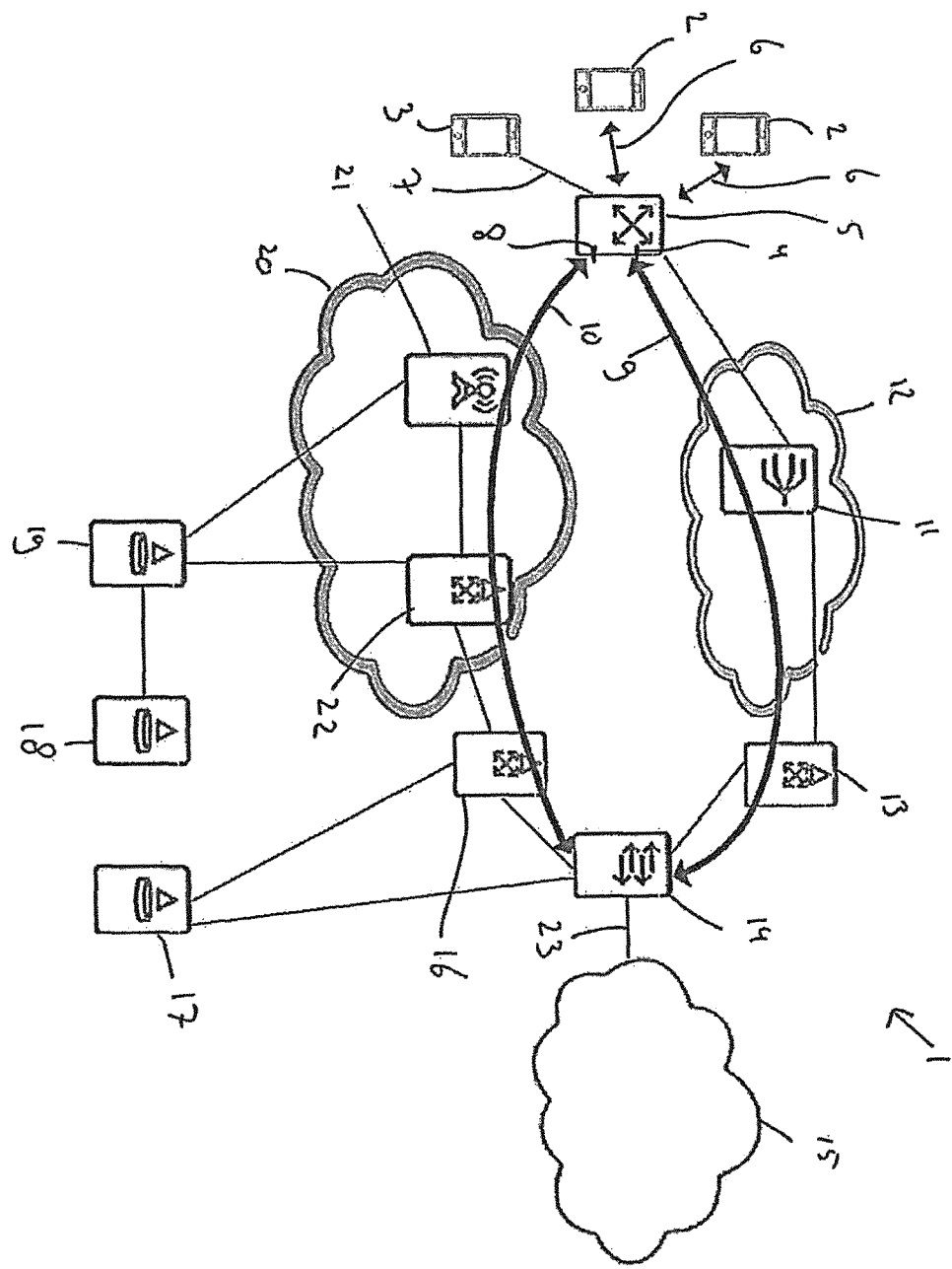
FIG. 1 is a schematic diagram representing a high level architecture of Hybrid Access network.

FIG. 1 is a schematic diagram representing a high level architecture of a Hybrid Access network 1. Here, you can see three User Equipment 2, 3, UE's, which are all connected to a customer-premises equipment, CPE, 5. The CPE 5 acts like a sort of router comprising Local Area Network, LAN, interfaces which are used for connecting with the UE's 2, 3, and comprising two Wide Area Network, WAN, interfaces 4, 8 for connecting the UE's 2, 3 to the outside world.

Presently, the UE's indicated with reference numeral 2 are connected to the CPE 5 via a wireless connection 6, for example a IEEE 802.11N connection or a like. The UE indicated with reference numeral 3 is connected to the CPE 5 via a stander Ethernet connection 7, for example using a Unshielded Twisted Pair, UTP, cable. The CPE 5 thus acts as some sort of gateway for controlling access between its local area network and the outside world.

Presently, the two WAN interfaces 4, 8 of the CPE 5 are different, i.e. related to a different access type. That is, the first WAN interface 4 is a Digital Subscriber Line, DSL, interface 4 for connection to a DSL access network 12. The DSL access network 12 comprises a Digital subscriber line access multiplexer, DSLAM, 11. Note that, according to the present disclosure, it is also possible that both WAN interfaces 4, 8 are not different, i.e. relate to a same access type.

The DSLAM 11 is arranged to operate as some sort of access node, wherein it collects data from its modem ports and aggregates their voice and data traffic into one composite signal via multiplexing. Depending on its architecture and setup, a DSLAM 11 is arranged to aggregate the DSL lines over its Asynchronous Transfer Mode, ATM, frame relay and/or Internet Protocol, IP, network.

Presently, the DSLAM 11 acts like a network switch or router. Typically, the DSLAM 11 is not able to re-route traffic between multiple Internet Protocol, IP, networks, but only between Internet Service Provider, ISP, devices and end-user connection points. The DSLAM 11 is able to switch traffic to a Broadband Remote Access Server, BRAS, 13.

Conventionally the BRAS 13 acts as the gateway to a public communication network, i.e. the internet. As such, the end-user traffic is routed across the Internet Service Provider, ISP, network to the Internet. Customer-premises equipment that interfaces well with the DSLAM 11 to which it is connected may take advantage of enhanced telephone voice and data line signalling features and the bandwidth monitoring and compensation capabilities it supports.

FIG. 1 does not disclose the conventional situation as described above, as the DSLAM 11 does not operate as a typical gateway server. The Hybrid Access network 1 disclosed in FIG. 1 comprises a hybrid access gateway server 14 arranged for controlling access to the service network 15, for example a public communication network like the internet. As such, the DSLAM 11 communicates directly with the hybrid access gateway server 14.

The second WAN interface 8 of the CPE 5 is a Long Term Evolution, LTE, interface 8. The LTE access network 20 comprises an access node like the Evolved Node B, eNodeB 21. The eNodeB is responsible for communicating with the CPE 5 and is comparable to a base transceiver station in conventional Global System for Mobile communications, GSM, networks. The corresponding LTE modem may be an external model, i.e. a dongle, connected via, for example, a USB port or may be an internal model.

The LTE access network 20 further comprises a Serving Gateway, SGW, 22. The SGW 22 is arranged to route and forward messages from, and to, the CPE 5. It 22 may also act as the mobility anchor for a user plane during inter-eNodeB handovers and as the anchor for mobility between LTE and other 3rd Generation Partnership Project, 3GPP, technologies. For idle state UE's 2, 3, the SGW 22 may terminate the downlink data path and may trigger paging when downlink data arrives for those particular idle state UE's 2, 3.

Further, a Public Data Network, PDN, gateway, PGW, 16 is provided. A PGW 16 is arranged to provide connectivity from any of the UE's 2, 3 to external packet data networks by being the point of exit and entry of traffic for any of the UE's 2, 3. The PGW 16 can be arranged to perform policy enforcement, packet filtering for each user, charging support, lawful interception and packet screening. Another role of the PGW 16 is to act as the anchor for mobility between 3GPP and non-3GPP technologies such as WiMax and 3GPP2.

In the present situation, the PGW 16 is connected to the hybrid access gateway server 14, which is subsequently connected to the service network 15 using a wired connection 23.

The network 1 shown in FIG. 1 further comprises a Mobility Management Entity, MME, 19. The MME 19 is a control-node for the LTE access-network 20. It 19 is responsible for idle mode UE paging and tagging procedure including retransmissions. It 19 is further responsible for authenticating users by interacting with a Home Subscriber Server, HSS 18.

Finally, a Policy and Charging Rules Function, PCRF, server 17 is provided which is arranged to determine policy rules in a network As a policy tool, the PCRF server 17 plays a central role in next-generation networks.

The invention will now be elucidated in detail in view of the explanation above with respect to the entities and their role in the hybrid access network 1 of FIG. 1. Hybrid access is a feature that allows multi-paths connectivity between two network elements, one situated in the network periphery and the other one in the core network. FIG. 1 shows two connections 9, 10 between the CPE 5 and the hybrid access gateway server 14. A first connection 9 between these two entities 5, 14 is established over the DSL interface 4 of the CPE 5, i.e. over the DSL access network 12. The second connection 10 between these two entities 5, 14 is established over the LTE interface 8 of the CPE 5, i.e. over the LTE access network 20.

Currently, there are several ways to implement the above described feature, depending on the Open Systems Interconnection, OSI, layer used to establish the connection. Regardless of the way of implementation, respectively the OSI layer, it is beneficial is the core network element, i.e. the hybrid access gateway server 14, is aware about the access type of the connection. This is beneficial as the hybrid access gateway server 14 is able to use this information in different scopes such as traffic steering, policing, lawful interception, etc.

It was the insight that the CPE 5 should itself embed the applicable access type in a connect message which is to be sent to the hybrid access gateway server 14 for connecting a corresponding UE 2, 3 to the service network 15. In such a way, the hybrid access gateway server 14 only needs to, upon receiving said connect message, look inside that message to determine what the corresponding access type actually is.

Once the hybrid access gateway server 14 has established what the access type is for the connection with the particular UE 2, 3, it is able to steer said traffic between said UE 2, 3, more particularly between CPE, and said service network 15 based on said identified applicable access type.

As mentioned in the background section, presently, the hybrid access gateway server is arranged to detect the access type by looking at the source Internet Protocol, IP, address of the received messages. Based on the IP address the hybrid access gateway server is arranged to provide for a best guess. This is, however, prone to errors, as the hybrid access gateway server needs an internal database that has to be manually provisioned with the IP addresses used for each access type.

In accordance with the present invention, the hybrid access gateway server 14 may be a separate entity or server, operating in the network 1. The hybrid access gateway server 14 may, however, also be implemented as a functional component in any of the existing network nodes or server used presently in the network, like the PGW.

Figure 2:
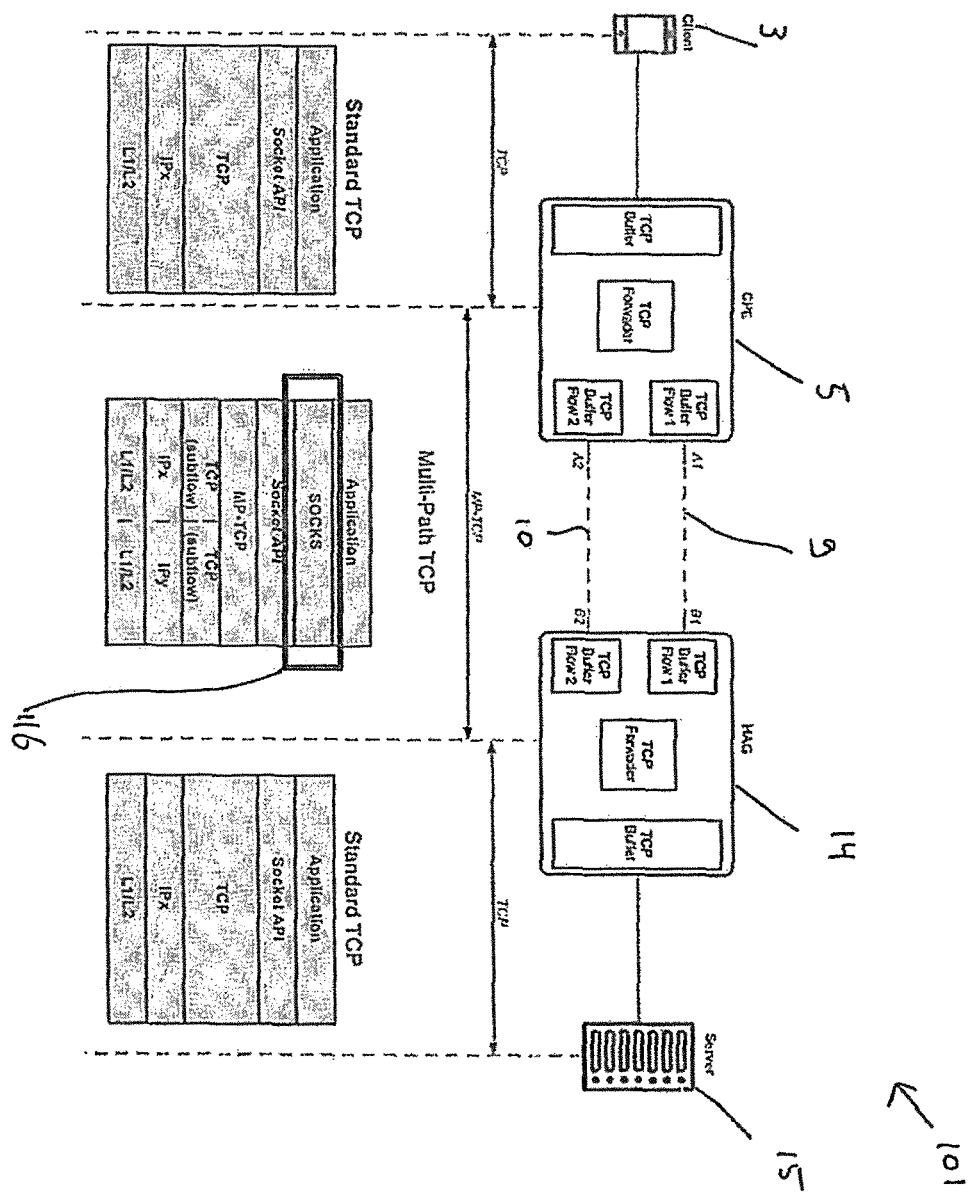
FIG. 2 is a diagram representing a customer-premises equipment and a hybrid access gateway, wherein an implementation of the connect message is shown.

FIG. 2 is a diagram 101 representing a customer-premises equipment 5 and a hybrid access gateway server 14, wherein an implementation of the connect message is shown. The access type information may be included at session layer level, which corresponds to, for example, the SOCK protocol as indicated with reference numeral 116.

Figure 3:
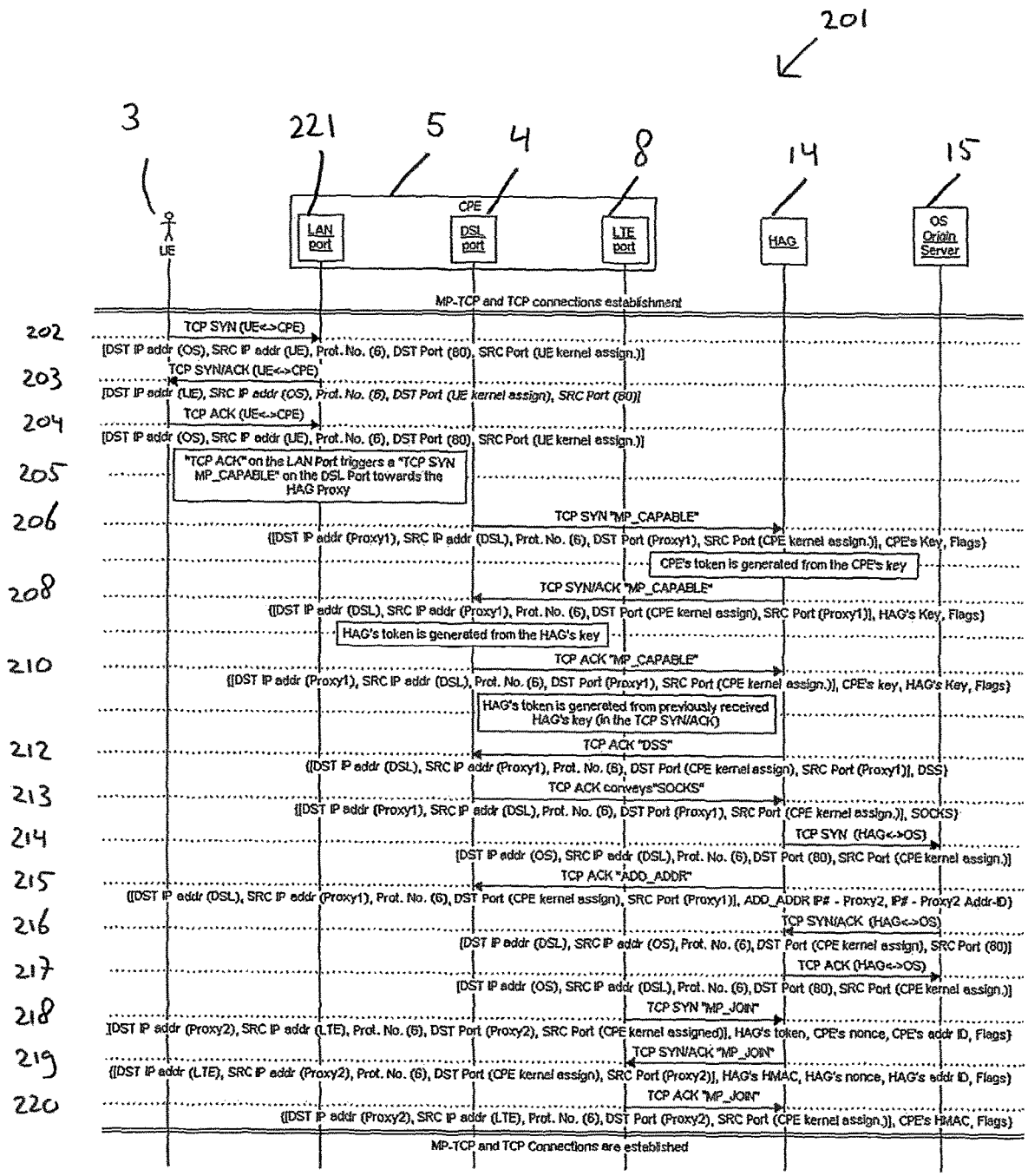
FIG. 3 is a signalling diagram illustrating the steps performed by the presented method.

FIG. 3 is a signalling diagram 201 illustrating the steps performed by the presented method. First, a connection is established between the UE 2, 3 and the CPE 5, wherein the UE 2, 3 is connected to the LAN, interface, i.e. LAN port, 221 of the CPE 5.

To establish a connection 7, the UE 2, 3 sends a TCP connection request, SYN, which will be intercepted and answered by CPE, SYN/ACK, and finally confirmed by the UE, ACK. Thus, conceptually, four control messages pass between the UE 2, 3 and the CPE 5. However, it's inefficient to send a SYN and an ACK in separate messages when one could communicate both simultaneously. Thus, in the normal sequence of events in connection establishment, first a request message is sent 202 by the UE 2, 3, which is acknowledged 203 by the CPE 5, wherein the acknowledgement also comprises a SYN, which is then again acknowledged 204 by the UE 2, 3 back to the CPE 5. At that point, a connection 7 between the UE 2, 3 and the CPE 5 is established.

The received acknowledgement 204, by the CPE 5, triggers a Transmission Control Protocol, TCP, SYN MP_CAPABLE message on the DSL interface 4 towards the hybrid access gateway server 14, indicating to the hybrid access gateway server 14 that the CPE 5 is capable for multipath TCP. In step 206, the message is sent to the hybrid access gateway server 14. This is basically similar to the regular connect message as described above, but it also contains an extra flag that mentions the capability to use multipath TCP, being the MP_CAPABLE flag.

The hybrid access gateway server 14 then sends a SYN ACK reply message 208 that also contains an MP_CAPABLE flag set, indicating that the hybrid access gateway server 14 is also capable for multipath TCP. Again, a final ACK reply message 210 is sent from the CPE 5 to the hybrid access gateway server 14. Each of the above described messages may contain a key that verifies the messages itself. That is, the CPE 5 sends its key in the first message towards the hybrid access gateway server 14, the hybrid access gateway server 14 sends its key in the SYN ACK message, and the CPE 5 sends back both keys in the final ACK reply message 210. Now, a connection 9 between the CPE 5 and the hybrid access gateway server 14 is established over the DSL interface 4.

The above described exchange allows the safe passage of MPTCP options on SYN messages to be determined. If any of these options are dropped, MPTCP will gracefully fall back to regular single-path TCP. It is noted that new sub flows may be established until a Digital Signature Standard, DSS, message 212 has been successfully received by the CPE 5.

In an implementation of the present method, the TCP ACK message 213 send in response to the above described DSS message 212 is amended. That it, the CPE 5 is arranged to determine the actual access type corresponding to the WAN interface used, i.e. the DSL interface indicated with reference numeral 4. The access type information is then embedded in a data field present in the TCP ACK message 213. This TCP ACK message 213 is received by the hybrid access gateway server 14, and this server 14 is then able to simply check that data field for the corresponding access type. This process is efficient and very reliable.

The method steps 214, 216 and 217 are all again related to the connection establishment between the hybrid access gateway server 14 and the service network represented by the reference numeral 15. This process is similar to the connection establishment between the CPE 5 and the hybrid access gateway server 14 and similar to the connection establishment between the UE 2, 3 and the CPE 5, as explained above.

A hybrid mechanism characterizes itself by the fact that multipath connections can be established between two network elements, i.e. the CPE 5 and the hybrid access gateway server 14. In the present case, this is illustrated with the method steps indicated with reference numeral 218, 219 and 220. Here, it is requested to join a connection established over the LTE interface 8 of the CPE 5 with the connection established over the DSL interface 4 of the CPE 5. As such, two connections between the CPE 5 and the hybrid access gateway server are joined together.

Figure 4:
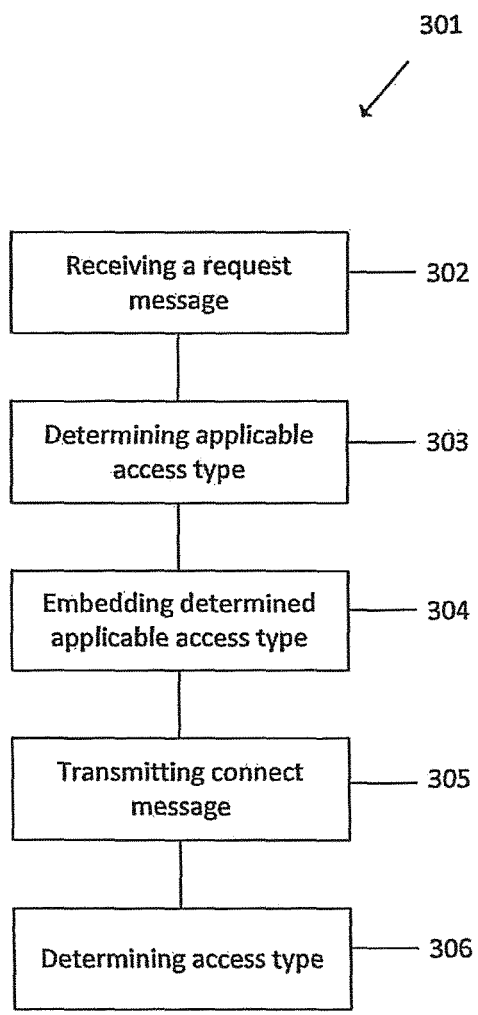
FIG. 4 is a flow chart illustrating a method according to the present disclosure.

FIG. 4 is a flow chart illustrating a method 301 according to the present disclosure.

The method 301 is directed to enabling a hybrid access gateway server 14 to identify an access type of traffic originating from a customer-premises equipment, CPE, 5 wherein said hybrid access gateway server 14 is arranged to control access to a service network 15, and wherein said CPE 5 comprises at least two Wide Area Network, WAN, interfaces, 4, 8.

The method comprising the steps of receiving 302, by said CPE 5, from a User Equipment, UE, 2, 3 a request message for requesting access to said service network, determining 303, by said CPE, an applicable access type for said received request message. Embedding 304, by said CPE, said determined applicable access type in a connect message to be sent to said hybrid access gateway server for connecting said UE to said service network, transmitting 305, by said CPE, said connect message having embedded therein said applicable access type, via a first of said at least two WAN interfaces, said first WAN interface being the one related to said applicable access type, to said hybrid access gateway server enabling said hybrid access gateway server to identify said access type and determining 306, by said hybrid access gateway server, said access type by receiving said connect message and by identifying said embedded applicable access type.

Figure 5:
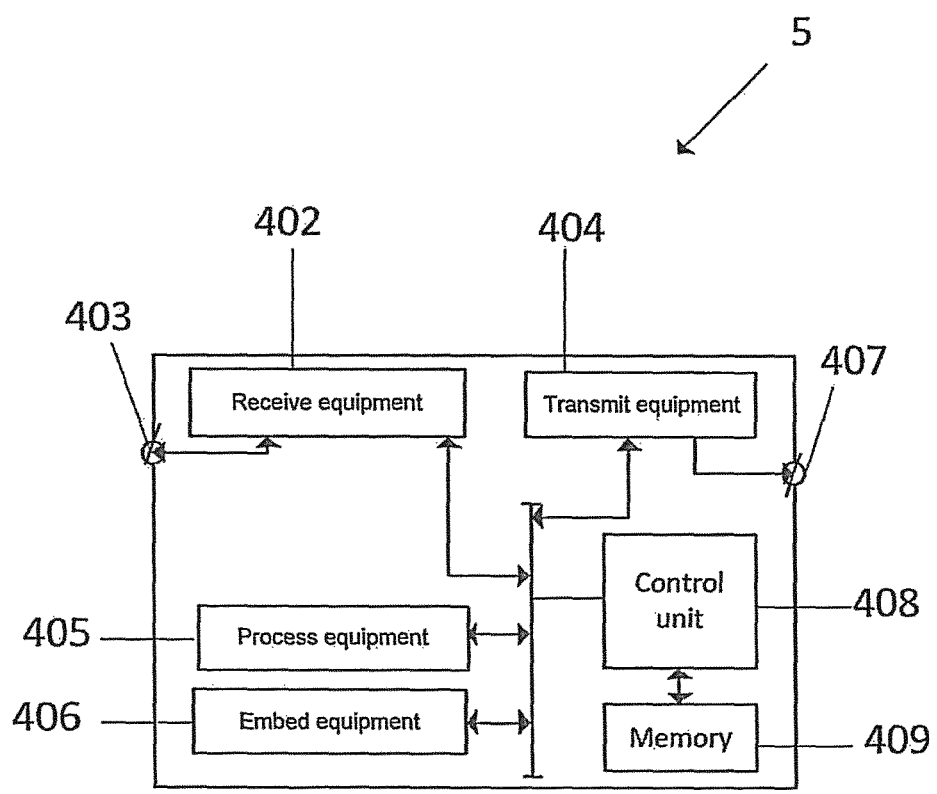
FIG. 5 is a schematic diagram illustrating an embodiment of a customer-premises equipment.

FIG. 5 is a schematic diagram illustrating an embodiment of a customer-premises equipment 5.

The customer-premises equipment, CPE, 5 is arranged for enabling a hybrid access gateway server 14 to identify an access type of traffic originating from said CPE 5, wherein said hybrid access gateway server 14 is arranged to control access to a service network 15, and wherein said CPE 5 comprises at least two Wide Area Network, WAN, interfaces 4, 8.

The CPE 5 comprises receive equipment 402 arranged for receiving, from a User Equipment, UE, a request message for requesting access to said service network; process equipment 405 arranged for determining an applicable access type for said received request message; embed equipment 406 arranged for embedding said determined applicable access type in a connect message to be sent to said hybrid access gateway server for connecting said UE to said service network; transmit equipment 404 arranged for transmitting said connect message having embedded therein said applicable access type, via a first of said at least two WAN interfaces, said first WAN interface being the one related to said applicable access type, to said hybrid access gateway server enabling said hybrid access gateway server to identify said access type.

Here, incoming data packets or messages pass through the input terminal 403 before they reach the receive equipment 402, or receiving module. Outgoing data packets or messages pass or are sent by the transmit equipment 404, or transmit module, via the output terminal 407.

The CME 5 further comprises a control unit 408 and a memory 409, which control unit 408 is connected to the transmit equipment 404, the receive equipment 402, the process equipment 305 and the embed equipment 406.

Figure 6:
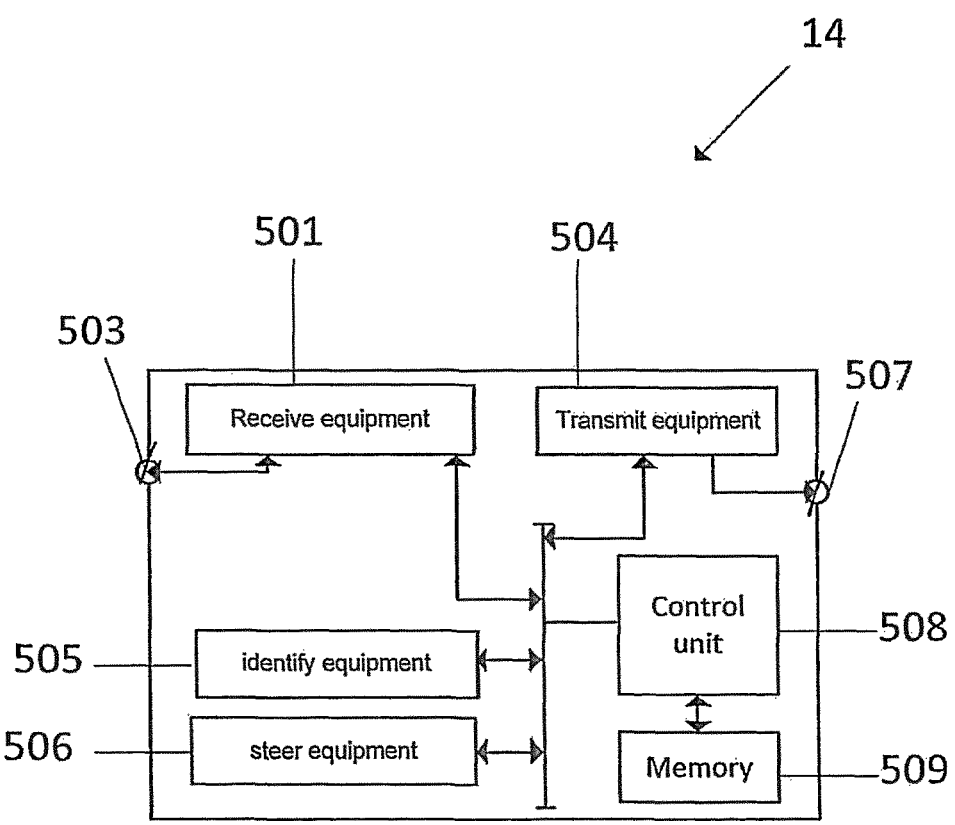
FIG. 6 is a schematic diagram illustrating an embodiment of a hybrid access gateway server.

FIG. 6 is a schematic diagram illustrating an embodiment of a hybrid access gateway server 14.

The hybrid access gateway server 14 is arranged for identifying an access type of traffic originating from a customer-premises equipment, CPE, 5 wherein said hybrid access gateway server 14 is arranged to control access to a service network 15, and wherein said CPE 5 comprises at least two Wide Area Network, WAN, interfaces, 4, 8.

The hybrid access gateway server comprising receive equipment 501 arranged for receiving, from said CPE 5, said connect message for requesting access to said service network 15, said connect message having embedded therein said applicable access type of traffic originating from said CPE 5; identify equipment 505 arranged for determining said access type by receiving said connect message and by identifying said embedded applicable access type for said traffic; and steer equipment 506 arranged for steering said traffic between said CPE and said service network based on said identified applicable access type.

Here, incoming data packets or messages pass through the input terminal 503 before they reach the receive equipment 501, or receiving module. Outgoing data packets or messages pass or are sent by the transmit equipment 504, or transmit module, via the output terminal 507.

The hybrid access gateway server 14 further comprises a control unit 508 and a memory 509, which control unit 508 is connected to the transmit equipment 504, the receive equipment 501, the identify equipment 505 and the steer equipment 506.

One of the advantages of the present disclosure is that the access type with respect to the WAN interface used by the CPE 5 is established accurately. That is, the likelihood for identifying a non-correct WAN interface, by the hybrid access gateway server 14, is very small.

Another advantage is that it efficiently facilitates correct steering in the hybrid access gateway server as the access type can reliably be determined by the hybrid access gateway server.

Yet another advantage is that the present disclosure does not have a significant impact on the implementation details required to convey the access type information in to the hybrid access gateway server. The inventors have found that, when a data field present in a connect message is used, the impact of the implementation process is relatively small.

The present disclosure is not limited to the embodiments as disclosed above, and can be modified and enhanced by those skilled in the art beyond the scope of the present disclosure as disclosed in the appended claims without having to apply inventive skills.

The invention claimed is:

1. A method of enabling a hybrid access gateway server to identify an access type of traffic originating from a customer-premises equipment (CPE) having at least two Wide Area Network (WAN) interfaces, the method comprising:
   receiving, by said CPE from a User Equipment (UE) a request message for requesting access to said service network;
   determining, by said CPE, an applicable access type for said received request message;
   embedding, by said CPE, an indicator of the determined applicable access type in a connect message to be sent to said hybrid access gateway server for connecting said UE to said service network, wherein the indicator does not include protocol address or port information associated with a WAN interface related to the determined applicable access type; and
   transmitting, by said CPE via the WAN interface related to the determined applicable access type, said connect message comprising said indicator of the determined applicable access type.

2. The method of claim 1, further comprising determining, by said hybrid access gateway server, said access type by receiving said connect message and by identifying said embedded applicable access type.

3. The method of claim 2, further comprising steering, by said hybrid access gateway server, said traffic between said CPE and said service network based on said identified applicable access type.

4. The method of claim 1, wherein said applicable access type is any of:
   3rd Generation Partnership Project (3GPP) access;
   Data Over Cable Service Interface Specification (DOCSIS) access;
   x-Digital Subscriber Line (xDSL) access;
   Worldwide Interoperability for Microwave Access (WiMAX) access;
   3rd Generation Partnership Project 2 (3GPP2) access.

5. The method of claim 1, wherein:
   each of the WAN interfaces is related to a different access type; and the indicator can take on plurality of values, each value corresponding to a different access type.

6. The method of claim 1, wherein the indicator of the determined applicable access type is embedded in a portion of the connect message associated with a protocol other than TCP and IP.

7. The method of claim 1, wherein said service network is the Internet.

8. A method of identifying, by a hybrid access gateway server arranged to control access to a service network, an access type of traffic originating from a customer-premises equipment (CPE) having at least two Wide Area Network (WAN) interfaces, said method comprising the steps of:
receiving, by said hybrid access gateway server from said CPE, a connect message for requesting access to said service network; and
determining an applicable access type for traffic originating from said CPE based on access type information embedded in said connect message, wherein the embedded access type information does not include protocol address or port information associated with a WAN interface related to the determined applicable access type.

9. The method of claim 8, further comprising steering, by said hybrid access gateway server, traffic between said CPE and said service network based on the determined applicable access type.

10. The method of claim 8, wherein:
each of the WAN interfaces is related to a different access type; and
the embedded access type information can take on plurality of values, each value uniquely representing a different access type.

11. A customer-premises equipment (CPE) arranged to control access to a service network, wherein said CPE comprises:
at least two Wide Area Network (WAN) interfaces configured to connect the CPE to a service network, each WAN interface being related to a different access type;
at least one processor operably coupled to the at least two WAN interfaces; and
a non-transitory storage medium comprising computer-executable instructions that, when executed by the at least one processor, configure the CPE to:
receive, from a User Equipment (UE) a request message for requesting access to said service network;
determine an applicable access type for said received request message;
embed an indicator of the determined applicable access type in a connect message to be sent to said hybrid access gateway server for connecting said UE to said service network, wherein the indicator does not include protocol address or port information associated with a WAN interface related to the determined applicable access type; and
transmit, to the hybrid access gateway server via the WAN interface related to the determined applicable access type, the connect message comprising the indicator of the determined applicable access type.

12. The CPE of claim 11, wherein the CPE is configured as one or more of the following: a router, switch or internet access gateway.

13. The CPE of claim 11, wherein said applicable access type is any of:
3rd Generation Partnership Project (3GPP) access;
Data Over Cable Service Interface Specification (DOCSIS) access;
x-Digital Subscriber Line (xDSL) access;
Worldwide Interoperability for Microwave Access (WiMAX) access;
3rd Generation Partnership Project 2 (3GPP2) access.

14. The CPE of claim 11, wherein:
each of the WAN interfaces is related to a different access type; and
the indicator can take on plurality of values, each value uniquely representing a different access type.

15. The hybrid access gateway server according to claim 14, further comprising computer-executable instructions that, when executed by the at least one processor, configure the hybrid access gateway to steer traffic between the CPE and the service network based on the determined applicable access type.

16. A hybrid access network comprising a hybrid access gateway server according to claim 15.

17. The hybrid access network according to claim 16, further comprising one or more customer premises equipment (CPE), each CPE comprising:
at least two Wide Area Network (WAN) interfaces configured to connect the CPE to a service network, each WAN interface being related to a different access type;
at least one processor operably coupled to the at least two WAN interfaces; and
a non-transitory storage medium comprising computer-executable instructions that, when executed by the at least one processor, configure the CPE to:
receive, from a User Equipment (UE) a request message for requesting access to said service network;
determine an applicable access type for said received request message;
embed an indicator of the determined applicable access type in a connect message to be sent to said hybrid access gateway server for connecting said UE to said service network, wherein:
each of the WAN interfaces is related to a different access type; and
the indicator can take on plurality of values, each value uniquely representing a different access type; and
transmit, to the hybrid access gateway server via the WAN interface related to the determined applicable access type, the connect message comprising the indicator of the determined applicable access type.

18. The hybrid access gateway server according to claim 14, wherein the access type information is embedded in a portion of the connect message associated with a protocol other than TCP and IP.

19. The CPE of claim 11, wherein the indicator of the determined applicable access type is embedded in a portion of the connect message associated with a protocol other than TCP and IP.

20. A hybrid access gateway server configured to control access to a service network by a customer-premises equipment (CPE) having at least two Wide Area Network (WAN) interfaces, said hybrid access gateway server comprising:
network interfaces to at least two different types of access networks, each access network corresponding to one of the CPE WAN interfaces;
at least one processor operably coupled to the at least two network interfaces; and
a non-transitory storage medium comprising computer-executable instructions that, when executed by the at least one processor, configure the hybrid access gateway to:

receive, from said CPE, a connect message for requesting access to said service network; and determine an applicable access type for traffic originating from said CPE based on access type information embedded in said connect message, wherein the embedded access type information does not include protocol address or port information associated with a WAN interface related to the determined applicable access type.

\* \* \* \* \*